Figure 1:
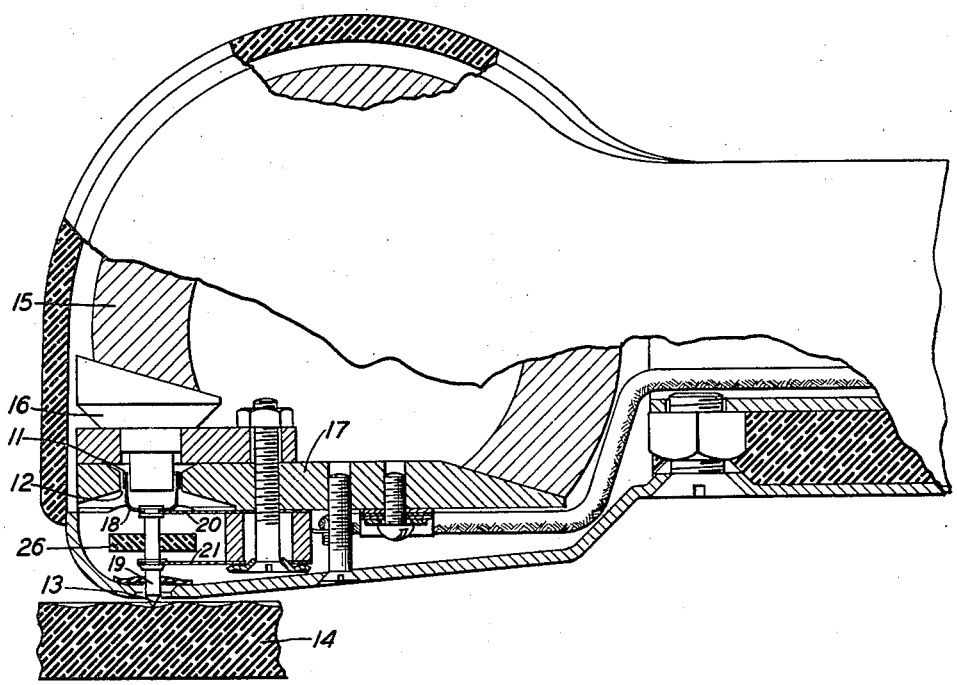

Feb. 25, 1936.   H. C. HARRISON   2,031,948
VIBRATION DAMPING DEVICE
Filed July 27, 1933

INVENTOR
H. C. HARRISON
BY
ATTORNEY

Patented Feb. 25, 1936

2,031,948

UNITED STATES PATENT OFFICE 2,031,948

VIBRATION DAMPING DEVICE

Henry C. Harrison, Port Washington, N. Y., assignor to Bell Telephone Laboratories, Incorporated, New York, N. Y., a corporation of New York Application July 27, 1933, Serial No. 682,454

1 Claim. (Cl. 274—1)

This invention relates to vibration translating devices and more particularly to means for damping the vibrations of the moving systems of phonograph reproducers.

Most mechanical vibratory systems are so proportioned that they resonate within the frequency range over which they are intended to be used. The transmission efficiency of such systems will therefore be considerably greater near resonance than for other frequencies. In such devices as phonograph reproducers it is highly desirable that the response be substantially uniform over the greater part of the frequency range and it is therefore common practice to introduce mechanical resistance or damping to reduce resonance peaks. This damping is usually applied by a viscous medium such as oil, or a resilient material, such as rubber, in contact with the moving parts.

In many devices resonances occur in the upper portion of the frequency range covered but the usual forms of damping are effective over substantially the whole frequency range so that in eliminating the resonant peaks the efficiency of the device is also decreased to an undesirable extent for other frequencies.

The object of this invention is to eliminate resonance peaks in the response of such devices without materially affecting their efficiency for lower frequencies.

In accordance with the general features of the invention the damping is applied to a vibrating system in such a way as to be effective only in the portion of the frequency range in which resonance occurs. This is accomplished by the use of a very "dead" damping material, that is to say, one which has very low resiliency and high internal resistance to deformation. A disc or thin block of reclaimed rubber or other material of this type when attached at its center to a vibrating system and left free at its periphery, will vibrate bodily as a mass element for low frequencies. Within a portion of the higher frequency range, depending on the proportions of the particular disc, the periphery will no longer vibrate in phase with the central portion and, due to the resistance of the disc to flexure, considerable energy is absorbed. Under this condition the mass effect of the disc becomes negligible and it functions as an anti-resonant circuit to absorb the excess energy at the resonant frequency. The proper dimensions for the disc to make the damping effective at the desired frequency can be readily determined experimentally in each case.

The presence of the added mass at low frequencies is not objectionable and in many devices such as phonographic reproducers it is desirable in that the mechanical impedance of the vibrating system is largely the stiffness of the mounting so that the addition of mass reduces the mechanical impedance of the system for low frequencies.

Figure 2:
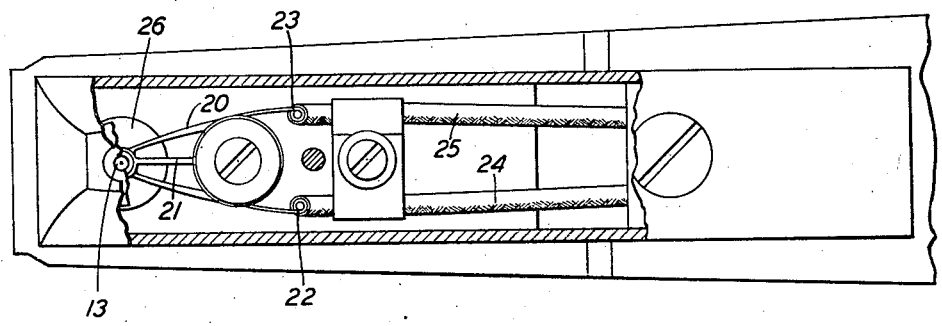

The invention will be more clearly understood from the following detailed specification and accompanying drawing in which:

Fig. 1 is a side view partly in section of a hill and dale phonograph reproducer equipped with a damping disc according to this invention; and Fig. 2 is a bottom view of the reproducer broken away to show the damping disc.

This reproducer is of the moving coil type and has a coil 11 which is vibrated in the annular air gap 12 by the stylus 13 as it follows the vertical undulations of the record 14. A magnetic flux for the air gap 12 is provided by the magnet 15, the poles of which are in contact with the central pole piece 16 and the pole piece 17 which together define the gap 12. The coil 11 is mounted on a cup member 18 which is connected to the stylus by a light tubular member 19. The vibrating system comprising the coil, the stylus and the members 18 and 19 is elastically supported by upper and lower springs 20 and 21. As will be seen more clearly from Fig. 2, the lower support is a single narrow spring, whereas the upper spring 20 is V-shaped. With this construction the stylus 13 is somewhat free laterally so that it may readily follow slight eccentricities of the groove, but the coil 11 is restrained from lateral movement in the gap by the upper spring 20. The ends of the coil 11 are brought out to binding posts 22, 23 from which connections are made to the external circuit by the conductors 24, 25 on the reproducer arm.

The constants of this particular reproducer are such that its resonant frequency in free air is very low and when the reproducer is used with ordinary commercial pressings it has no tendency to resonate within the range of interest and damping is therefore unnecessary. It was found, however, that with certain materials of relatively low stiffness such as cellulose acetate, that the moving system tends to resonate at high frequencies with the comparatively low stiffness of the record material. This results in a small resonant peak in the upper portion of the frequency range ordinarily in the neighborhood of 9000 cycles. In high quality systems even slight irregularities in response can not be tolerated, but as already pointed out, the usual forms of damping are effective over the whole frequency range so that their use would result in a loss in response over the whole range covered.

The disc of reclaimed rubber 26 for this particular reproducer is somewhat less than a quarter of an inch in diameter and less than a sixteenth of an inch thick and is supported solely by being cemented to the tubular member 19. This small disc vibrates bodily with the moving system for low frequencies and is therefore the equivalent of a small added mass which has no objectionable effect at low frequencies upon the operation of the reproducer, but on the other hand, has a slightly beneficial effect in that it nullifies a portion of the stiffness of the mounting springs 20 and 21 which comprises the major portion of the needle point impedance of the moving system for low frequencies. The net result for low frequencies, therefore, is simply that the reproducer is of slightly lower mechanical impedance than when the damping disc is not used. For higher frequencies (in the neighborhood of 9000 cycles in this case), the vibrations of the moving system are so rapid that the disc 26 no longer moves as a unit and radial waves pass out toward the periphery of the disc. Due to the very high internal resistance of the material of the disc this flexing action absorbs considerable energy from the moving system and effectively counteracts the tendency of the moving system to resonate into the record material so that uniform response is maintained at these high frequencies without reducing the low frequency response.

While the invention has been described with reference to its application to a particular reproducer, it will be understood that it is applicable in general to any vibrating system requiring differential damping and since the disc functions as an anti-resonant element, it can be proportioned to eliminate a resonant peak in the central portion of the frequency range of response without impairing the response at frequencies below or above the portion of the range where damping is required. The damping element has been shown, in this case, as a disc, but it will be understood that the particular configuration is not critical. In certain cases, for example, it may be square or any other desired configuration.

What is claimed is:

In a phonograph reproducing system, the combination with a record of relatively low stiffness and a reproducer having a moving system co-operating therewith and resonating with the material of the record at certain frequencies, of the frequency selective damping means for reducing the response of the reproducer at the resonent frequencies comprising a thin disc of damping material secured at its central portion to the moving system with the plane of the disc normal to the motion of the system, the disc being proportioned to flex in a direction normal to the plane of the disc at the resonating frequencies and to vibrate bodily as a mass element at lower frequencies.

HENRY C. HARRISON.